United States Patent [19]

Anderson

[11] Patent Number: 5,174,840

[45] Date of Patent: Dec. 29, 1992

[54] SHELL CONSTRUCTION AND METHOD OF MAKING SAME

[75] Inventor: James L. Anderson, Canton, Ohio

[73] Assignee: Everhard Products, Inc., Canton, Ohio

[21] Appl. No.: 797,338

[22] Filed: Nov. 25, 1991

[51] Int. Cl.⁵ .................... B32B 31/18; B29C 45/00; B29C 47/00

[52] U.S. Cl. ................... 156/69; 156/242; 156/244.13; 156/244.18; 156/245; 156/293; 156/294; 242/68.6

[58] Field of Search ............. 156/69, 244.13, 244.18, 156/293, 294, 242, 245; 242/68, 68.6, 117, 118.31

[56] References Cited

U.S. PATENT DOCUMENTS

| | | | |
|---|---|---|---|
| 1,357,345 | 11/1920 | Phelps | 242/68.6 |
| 1,524,483 | 1/1925 | Lowe | 242/68.6 |
| 1,545,661 | 7/1925 | Johnson | 242/68.6 |
| 2,223,682 | 12/1940 | Gammeter | 242/68.6 |
| 4,201,306 | 5/1980 | Dubois et al. | 156/69 |
| 4,310,366 | 1/1982 | Van Manen | 156/244.18 |

Primary Examiner—Caleb Weston
Attorney, Agent, or Firm—Michael Sand Co.

[57] ABSTRACT

A calender stock shell for the storing and transportation of strip material is formed by extruding a hollow tubular extrudate of a high impact ABS material and then forming a plurality of tubes therefrom. A pair of hubs, also formed of a high impact ABS material, preferably by injection molding, is secured in the end openings of the tube by an adhesive. A metal guide sleeve is trapped within the hollow interior of the tube by being seated within complementary shaped internal recesses formed in each of the hubs which surround central openings formed therein to facilitate the placement of a reel bar through the shell when placing the shell on a piece of equipment.

2 Claims, 3 Drawing Sheets

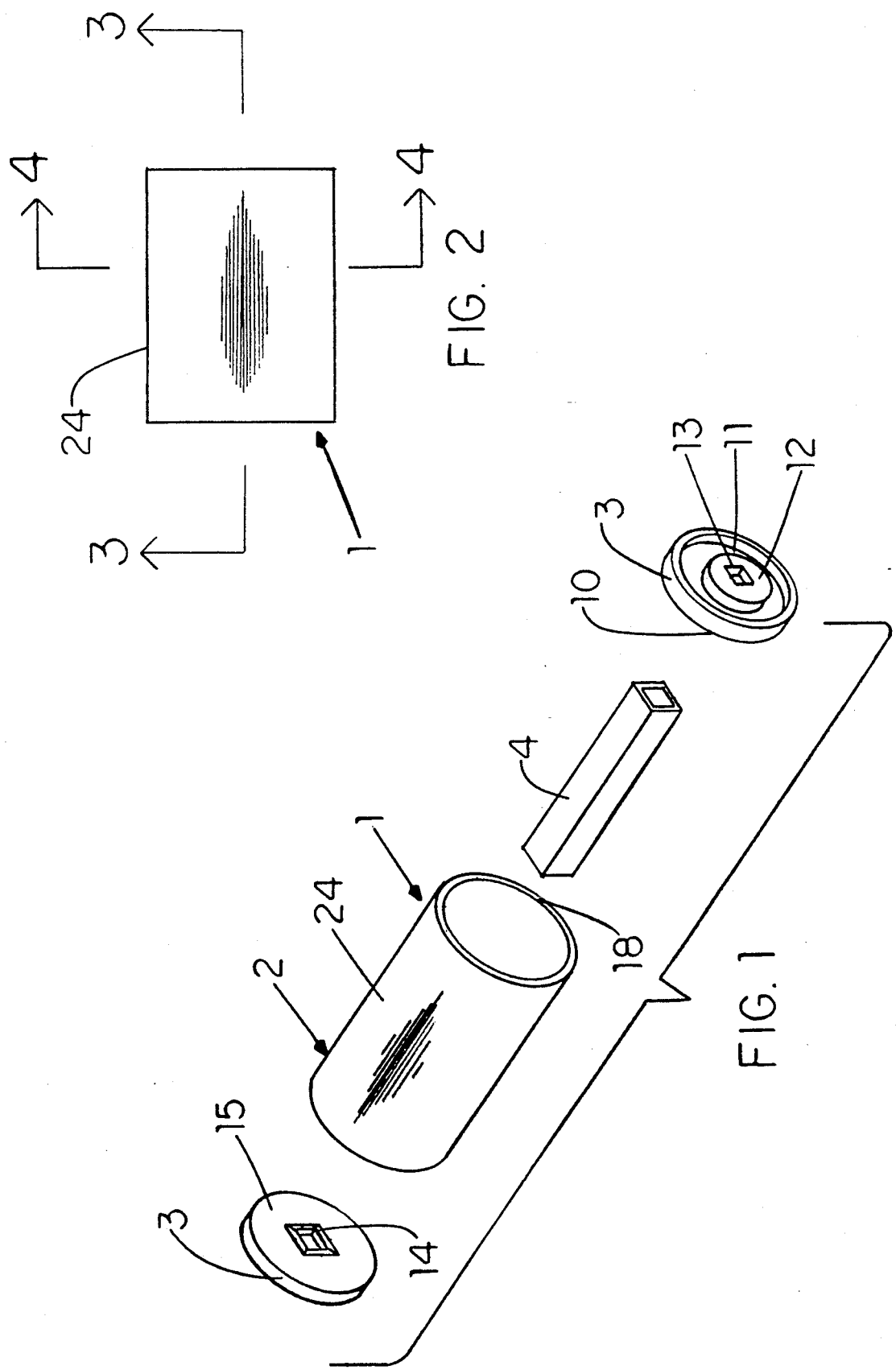

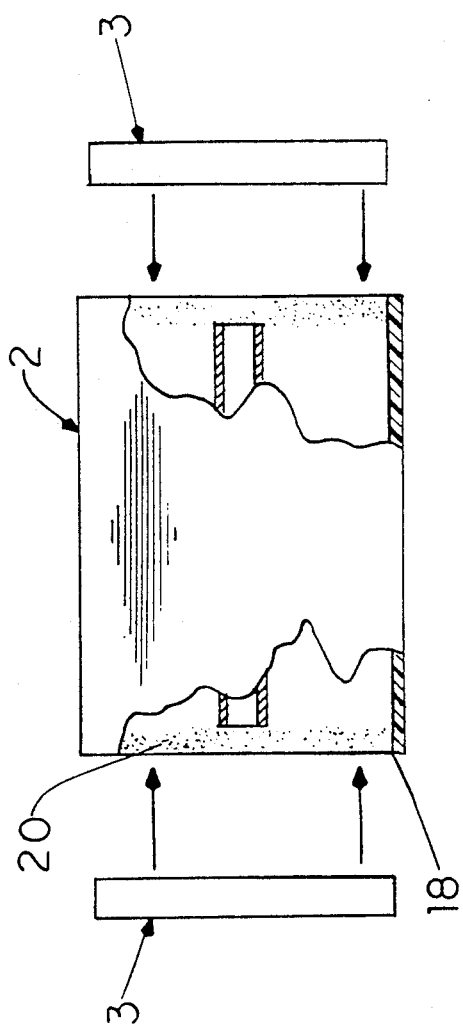
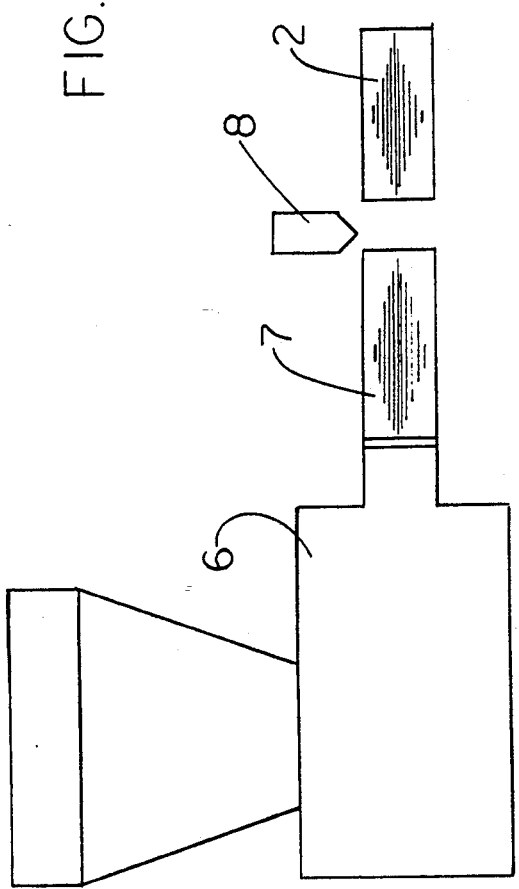
FIG. 6
FIG. 5

SHELL CONSTRUCTION AND METHOD OF MAKING SAME

BACKGROUND OF THE INVENTION

1. Technical Field

The invention relates to tubular shells or service cores used for the storage of strip material, and in particular for elastomeric calender stock used in the tire building industry. More particularly, the invention relates to such a shell formed of extruded medium or high impact ABS material and a pair of end hubs molded of the same material which are bonded by an adhesive within the ends of the tubes.

2. Background Information

During the building of tires, various strips of elastomeric material which are usually in a "green" tacky condition are transferred from various areas to a tire building drum where they are assembled into a finished green tire for subsequent vulcanization. These strips are referred to as calender stock and are transported on cylindrical-shaped shells which are usually mounted on reels, which in turn, are suspended on a transport rack for subsequent unreeling at the tire building drum.

Heretofore, these calender stock shells or service cores which they are sometimes referred to in the industry were made of wood. However, the wood shells will chip and splinter providing a contamination into the calender strip resulting in the rejection of the strip and possibly of a tire produced therefrom, if undetected during the building of the tire. Other such shells are made of steel. Although these steel shells eliminate many of the chipping and splintering problem of the wood shells, they are considerably heavier and more expensive.

Thus, the need existed for an improved calender stock shell or service core formed of a lightweight rugged material which would not contaminate the elastomeric strips transported thereby.

SUMMARY OF THE INVENTION

Objectives of the invention include providing an improved stock shell formed of a medium to high impact ABS material, which is produced by extruding tubular-shaped members and the subsequent bonding of a pair of hubs, also molded of the same type of matrial, into the open ends thereof.

A further objective of the invention is to provide such a shell which has a guide bar trapped within the interior of the shell to assist the guiding of a storage reel therethrough to facilitate the mounting of the shell on the transport equipment.

A still further objective of the invention is to provide such a shell in which the end hubs are secured within the open ends of the strip support tube by a readily available proven adhesive, thereby eliminating additional components and expensive manufacturing procedures, such as by welding or mechanical fasteners as used in the steel shells.

Another objective of the invention is to provide such an improved shell in which the outer surface of the tube may have a friction coating applied thereto to facilitate the gripping of the calender stock on the shell during the initial winding and placement of the stock on the shell.

A further objective of the invention is to provide an improved method of manufacture of such shells by a relatively simple and inexpensive process carried out by existing molding equipment.

These objectives and advantages are obtained by the improved shell of the invention, the general nature of which may be stated as including a tube formed of a medium to high impact ABS material having a hollow interior and a pair of open ends; a pair of end hubs molded of a medium to high impact ABS material, each of said hubs having a central opening formed therein, with said hubs being secured within the open ends of the tube; and a rigid sleeve located within the interior of the tube and extending between the end hubs for guiding a mounting member through the shell when mounting the shell on a service reel.

These objectives and advantages are further obtained by the improved method of the invention, the general nature of which may be stated as a method of making a shell for the subsequent storage of strip material thereon, which includes the steps of extruding a tubular extrudate of a medium to high impact ABS material; cutting the tubular extrudate into a plurality of discrete length tubes; injection molding a plurality of cylindrical hubs of a medium to high impact ABS material, each of said hubs having an outer diameter complementary to the internal diameter of the tubes; placing at least a pair of the hubs into spaced open ends of one of the tubes; and bonding the hubs within the open ends of the tube to form the shell.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is an exploded perspective view of the improved strip supporting shell of the invention;

FIG. 2 is an enlarged side elevational view of the shell of FIG. 1 in assembled condition;

FIG. 5 is a diagrammatic view showing the injection molding of the tube lengths from which the shell is formed; and FIG. 6 is an exploded view of the assembled shell of FIG. 2 with the end caps shown in a removed condition prior to assembly with the tube, with portions of the tube broken away and in section.

Similar numerals refer to similar parts throughout the drawings.

DESCRIPTION OF THE PREFERRED EMBODIMENT

Figure 3:
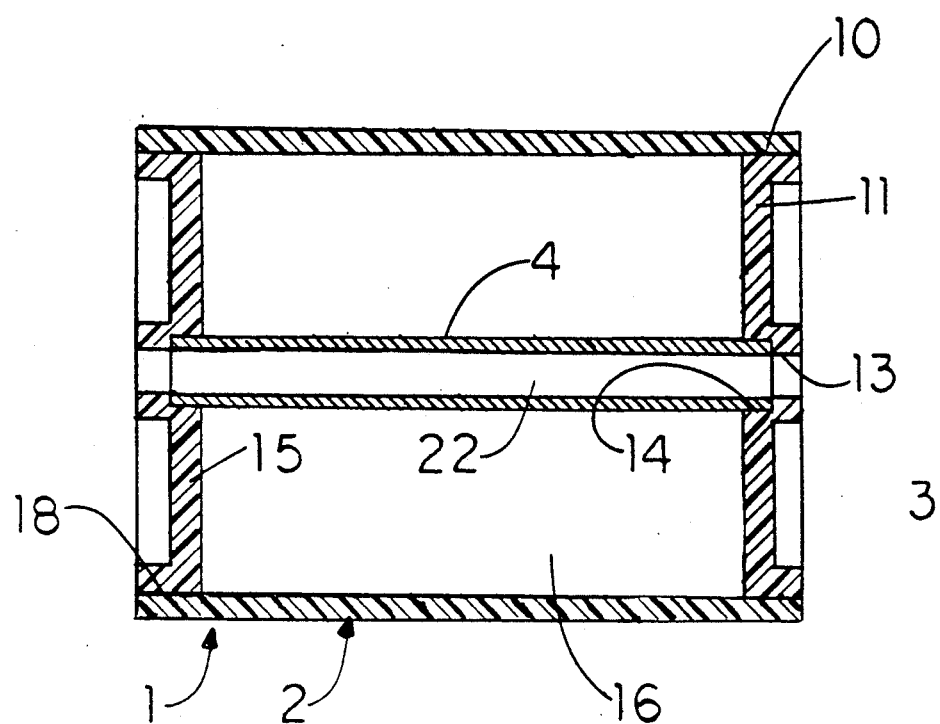
FIG. 3 is an enlarged fragmentary sectional view taken on line 3—3, FIG. 2.
Figure 4:
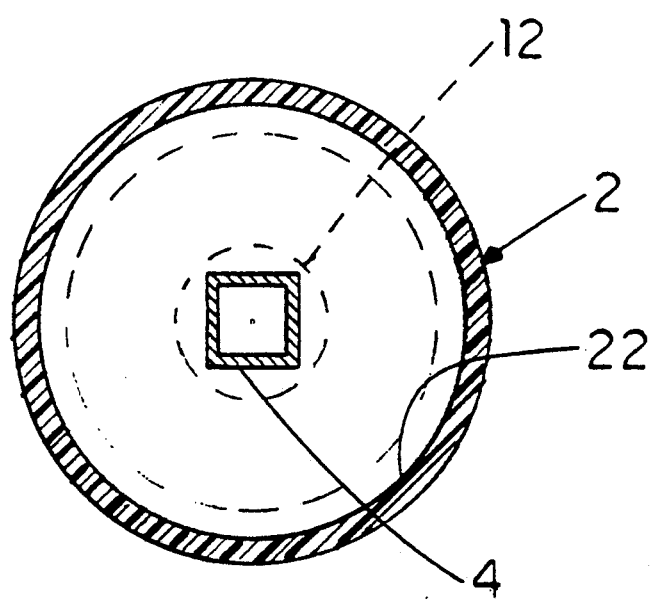
FIG. 4 is an enlarged fragmentary sectional view taken on line 4—4, FIG. 2.

The improved shell of the invention is indicated generally at 1, with the main components thereof being shown particularly in FIG. 1. Shell 1 includes a hollow cylindrical-shaped tube 2, a pair of end hubs 3 and a inner reel guiding bar 4.

In accordance with the invention, tube 2 is injection molded as shown particularly in FIG. 5, of a medium to high impact plastic material such as Acrylonitrile-Butadiene-Styrene (ABS), by a usual type of extruder 6. A continuous tubular extrudate 7 is extruded through a nozzle 8 and is cut by a cutting mechanism 8 into discrete lengths of tubes 2. A preferred type of ABS material found suitable for the formation of tubes 2 have a tensile strength of 6380 p.s.i., a tensile elongation of 25%, a flexural strength of 8780 p.s.i., a Rockwell hardness of R-105, and specific gravity of 1.04.

End hubs 3 are one-piece members having an annular configuration formed by a cylindrical outer surface 10, an integrally formed end wall 11, and a concentrically outwardly extending cylindrical central flange 12 formed with a rectangularly-shaped hole 13 therein. Hole 13 is surrounded by a rectangular-shaped recess 14 formed on the inside surface 15 of end wall 11.

The ends of guide bar 4 are seated within rectangular recesses 14, as shown particularly in FIG. 3, and are retained within the hollow interior 16 of tube 2 by the mounting of end hubs 3 within open ends 18 of tube 2.

In further accordance with the invention, end hubs 3 are molded preferably of the same ABS material or another type of medium to high impact plastic material as is tube 2. After the molding of end hubs 3 and the injection molding and formation of tube 2, the components are assembled as shown in FIG. 6. An annular band of an adhesive 20 is applied along the inside surface of tube 2, generally equal in width to the axial length of cylindrical outer surface 10 of hub 3. Hubs 3 then are moved axially inwardly into open ends 18 of tube 2 and into contact with adhesive 20. Guide bar 4 is seated within rectangular recesses 14 to form the finalized stock shell, shown particularly in FIG. 2.

Adhesive 20 is a readily available plastic-to-plastic type of adhesive, one example of which is sold by The J. C. Whitlam Manufacturing Company of Wadsworth, Ohio and identified as its All Purpose Clear Regular Bodied Cement. A primer may be applied initially to the surface prior to applying adhesive 20 to provide for a better bond. In the alternative, adhesive 20 can be applied to cylindrical outer surfaces 10 of hubs 3, in addition to or instead of, the application of the adhesive to the inside end surface of tube 2.

Thus, when fully assembled as shown in FIG. 3, shell 1 then becomes a rigid structure having guide tube 4 trapped therein which assists in the telescopic sliding movement of a reel through hollow interior 22 of bar 4 when placing shell on a transportation or reel support equipment.

If desired, a non-slip coating 23 as shown in FIG. 2, can be applied to the outer cylindrical surface 24 of tube 2 to provide for a better initial grip between the shell and elastomeric strip of material when being wound thereon. Non-slip coating 23 is a readily available material well known in the art, one example of which is sold under the trademark, GRIPTRED (Model 202-D), and distributed by Watson Standard Co. of Pittsburgh, Pa.

Accordingly, the improved shell construction of the invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved shell is constructed and used, the characteristics of the construction, and the advantageous, new and useful results obtained; the new and useful structures, devices, elements, arrangements, parts and combinations, are set forth in the appended claims.

I claim:

1. A method of making a shell for the subsequent storage of strip material thereon including the steps of:
   extruding a tubular extrudate of a medium to high impact ABS plastic material;
   cutting the tubular extrudate into a plurality of discrete length tubes;
   injection molding a pair of cylindrical hubs of a medium to high impact ABS plastic material, each of said hubs having an outer diameter complementary to the internal diameter of the tubes;
   molding into each of the hubs a centrally located rectangular opening and a recess about the periphery of said opening on an inner surface of said hubs;
   seating opposite ends of a rigid tubular sleeve within the recess of each hub;
   placing the hubs into spaced open ends of each of the tubes; and
   bonding the hubs within the open ends of the tubes to form a calender shell with the tubular sleeve being trapped within the shell by the hubs.

2. The method defined in claim 1 including the step of applying a frictional coating onto an outer surface of the tube.

* * * * *